United States Patent [19]

Emmons et al.

[11] 4,138,545
[45] Feb. 6, 1979

[54] OXAZOLIDINE-TERMINATED POLYESTERS

[75] Inventors: William D. Emmons, Huntingdon Valley; Travis E. Stevens, Ambler, both of Pa.

[73] Assignee: Rohm and Haas Company, Philadelphia, Pa.

[21] Appl. No.: 866,885

[22] Filed: Jan. 4, 1978

[51] Int. Cl.$^2$ ............................................. C08G 63/68
[52] U.S. Cl. ............................. 528/289; 260/307 FA; 428/425; 528/423; 544/96
[58] Field of Search ......... 260/75 TN, 75 N, 307 FA; 428/425; 544/96; 528/289

[56] References Cited

U.S. PATENT DOCUMENTS

| | | | |
|---|---|---|---|
| 4,002,601 | 1/1977 | Hajek et al. | 260/77.5 AT |
| 4,002,637 | 1/1977 | Lewis et al. | 260/307 FA |
| 4,024,117 | 5/1977 | Emmons | 260/78.3 R |
| 4,043,956 | 8/1977 | Hutton et al. | 260/23 R |

Primary Examiner—Lucille M. Phynes

[57] ABSTRACT

Disclosed are polyfunctional oxazolidine-terminated polyesters of the general formula:

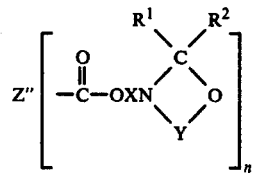

wherein
Z" is the residue of a polyester having a plurality of terminal

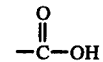

groups, the polyester being the condensation product of organic acids and alcohols of the formulae

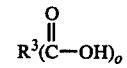

and $R^4(OH)_p$, in which o is 2 or 3 and p is 2 to 4, each of o and p preferably being 2;

$R^1$ and $R^2$ are hydrogen, $C_1$–$C_4$ alkyl, phenyl, benzyl, or collectively $C_5$–$C_6$ cycloalkylene, preferably hydrogen;

$R^3$ is a covalent bond, a $C_1$–$C_{10}$ residue of an aliphatic or aromatic polycarboxylic acid, preferably $C_1$–$C_{10}$ alkylidene;

$R^4$ is the residue of a polyol having 2-15 carbon atoms, preferably $C_2$–$C_{10}$ alkylidene;

X and Y are selected from the radicals (—$CH_2$—)$_2$ and (—$CH_2$—)$_3$, preferably (—$CH_2$—)$_2$;

n is an integer having a value of at least 2, preferably no more than about 8;

the acid moieties being present in an amount of from 2 to about 12 units and the alcohol moieties numbering from 1 to about 11, with the proviso that said polyesters terminated with a plurality of oxazolidine groups provide a useable viscosity for coatings in the formulations in which they are used, suitably produced by means of a transesterification reaction between a hydroxy oxazolidine, a polycarboxylic acid ester in which the carboxyl groups are esterified by a $C_1$–$C_4$ alkanol such as methanol, and a polyol. The oxazolidine-terminated polyesters are useful in preparing or formulating moisture-curable mixtures with polyfunctional isocyanates, preferably having two —NCO groups, but compounds having three or more such groups being useful, for coatings, caulks, impregnants, adhesives for textiles, leather, plastics, wood, and metals, and binding agents for pigments, fibers and nonwoven fabrics. The approximate $\overline{M}w$ is suitably between 600 and 5000 and the approximate $\overline{M}n$ is suitably between 400 and 3000 as determined by gel permeation chromatography.

29 Claims, No Drawings

OXAZOLIDINE-TERMINATED POLYESTERS

This invention relates to new compounds which may be generally referred to as polyfunctional oxazolidine-terminated polyesters.

In U.S. Pat. No. 3,864,335 there have been disclosed polyfunctional ester oxazolines of the general formula:

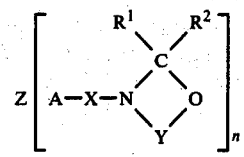

wherein n is an integer equal to the valence of Z of at least two, preferably two or three, most preferably two;

Z is a saturated alkylene hydrocarbon divalent radical, preferably having 1–34 carbon atoms, most preferably 1–4 carbon atoms, an n-valent phenylene, a halo-substituted phenylene, ($C_1$-$C_8$) alkyl-substituted phenylene, the divalent hydrocarbon residue of 1,1,3-trimethyl-5-carboxy-3-(p-carboxy phenyl) indane a $C_2$-$C_3$ unsaturated alkenylene divalent radical, or a

O=C< group;

A is selected from

(the left valence being connected to the Z radical) and —O— when Z is

O=C<;

X is the radical

where m is an integer of 2 or 3, preferably 2, and $R^5$ and $R^6$ are individually hydrogen or ($C_1$-$C_6$) alkyl groups, preferably hydrogen;

$R^1$ is hydrogen, phenyl, benzyl, or a ($C_1$-$C_{12}$) alkyl group;

$R_2$ is hydrogen or a ($C_1$-$C_4$) alkyl group; or $R^1$ and $R^2$ can be taken together to form a single group selected from the group consisting of a cyclopentamethylene group, a cyclohexamethylene group, or a ($C_1$-$C_2$) alkyl-substituted cyclopentamethylene or cyclohexamethylene group; and Y is the radical

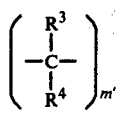

wherein m' is an integer of 2 or 3, preferably 2, and $R_3$ and $R^4$ are individually hydrogen, phenyl, or benzyl groups. Preferably m and m' will be equal.

This patent is a continuation-in-part of Ser. No. 768,905, filed Oct. 18, 1968.

These polyfunctional ester oxazolidines have been reported as being useful in preparing or formulating adhesives, caulks, lacquers, paints, varnishes, leather impregnants and moisture curing coating systems.

U.S. Pat. No. 3,743,626, a continuation-in-part of Ser. No. 768,905, filed Oct. 18, 1968, is also of interest in connection with similar moisture curing systems, such as a polyisocyanate with bis(oxazolidinyl)adipate and the like, as noted in column 15, lines 20–25. Polycarboxylic acid esters of monohydric alcohols are apparently used in obtaining the simple esters of the oxazolidines of this patent by transesterfication, there being no suggestion of the use of

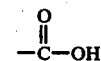

terminated polyesters obtained by condensation of a polyol and a polycarboxylic acid in accordance with the present invention. As is shown by the comparative examples, the latter have superior properties and furthermore are more economical, as concerns the final composition.

The moisture curing compositons of the present invention make possible useful improvements in such preparations or formulations in that: (a) coatings made in accordance therewith are far more flexible than their prior art counterparts; (b) the products tend to hydroplasticize less than their forerunners so that less water is absorbed into the films and there is thus a lesser tendency to alter the properties of resultant coatings; and (c) in caulking applications the caulks lose less of their chemical structures by volatilization during the curing stages because of moisture activation, thereby keeping shrinkage of the caulks to a minimum after their use.

The present invention which makes possible these and other advantages involves the provision of compounds of the general formula:

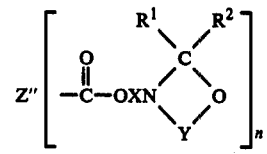

wherein z" is the residue of a polyester having a plurality of terminal

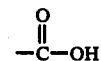

groups, the polyester being the condensation product of organic acids and alcohols of the formula

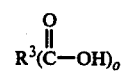

and $R^4(OH)_p$. in which o is 2 or 3 and p is 2 to 4, each of o and p preferably being 2;

$R^1$ and $R^2$ are hydrogen, $C_1$-$C_4$ alkyl, phenyl, benzyl, or collectively $C_5$-$C_6$ cycloakylene, preferably hydrogen;

$R^3$ is a covalent bond, a $C_1$-$C_{10}$ residue of an aliphatic or aromatic polycarboxylic acid, preferably $C_1$-$C_{10}$ alkylidene;

$R^4$ is the residue of a polyol having 2–5 carbon atoms, preferably $C_2$-$C_{10}$ alkylidene;

X and Y are selected from the radicals $(-CH_2-)_2$ and $(-CH_2-)_3$, preferably $(-CH_2-)_2$;

n is an integer having a value of at least 2 preferably no more than about 8;

the acid moieties being present in an amount of from 2 to 4 or more/ the acid moieties being present in an amount of from 2 to about 12 units and the alcohol moieties numbering from 1 to about 11, with the proviso that the said polyesters terminated with a plurality of oxazolidine groups provide a useable viscosity for coatings in the formulations in which they are used. Preferably, n is no more than about 8.

Any aliphatic polyhydric alcohol containing at least two esterifiable aliphatic hydroxy groups, or mixtures of such alcohols, can be used in preparing the polyesters of the present invention. Some illustrative examples of the various polyhydric alcohols, including polyether polyols, which can be used in synthesizing the telomerized polyesters used in this invention are ethylene glycol, di-, tri-, and tetra-ethylene glycols, glycerine, tri-methylolpropane, pentaerythryritol, dihydroxycyclohexane, tri-methylene glycol, tetramethylene glycol, 2,3-dihydroxybutane, 1,4-dihydroxybutane, 1,4-dihydroxy-2-ethylbutane, 1,6-dihydroxyhexane, 1,8-dihydroxyoctane, 2-10, dihydroxydecane, 1,4-dihydroxycyclohexane, 1,4-dimethylolcyclohexane, 2,2-diethylpropanediol-1,3-, 2,2-dimethyl-propanediol-1,3, 3-methylpentanediol-1, 4,2,2-diethylbutanediol-1,3, 4,5-dihydroxynonane, pentamethylene glycol, heptamethylene glycol, nonamethylene glycol, decamethylene glycol, propylene glycol, dipropylene glycol, 2-ethylhexanediol-1,3, etc. The invention is not limited to the use of diols; polyols such as trimethylol propane and pentaerythritol are also useful. Alkylene oxides can also be used to give corresponding glycol derivatives, such as propylene oxide, ethylene oxide, 2-3-butylene oxide, etc.

Any aliphatic or aromatic polycarboxylic acid may be used in preparing the polyesters of this invention. Examples include oxalic, malonic, succinic, adipic, glutaric, sebacic, 2-methyl succinic, pimelic, 2,3-dimethyl-succinic, suberic, hexyl succinic, 1,2-hexahydrophthalic, 1,3-hexahydrophthalic, 1,4-hexahydrophthalic, azelaic, 1,1-cyclobutane-dicarboxylic, trans-1,4-cyclohexanedicarboxylic, 3,3-diethyl glutaric, 3,3-dimethyl glutaric, 2,2-dimethyl glutaric, 2,2-dimethyl succinic, 2-ketoglutaric, diglycollic, phthalic, isophthalic, terephthalic, trimellitic, aconitic, citric, and 1,2,3-propanetricarboxylic acids, and the like.

The following typical formulae represent oxazolidine esters derived from a polyester of a diol and a dicarboxylic acid, a diol and a tricarboxylic acid, and a triol and a dicarboxylic acid, respectively, m being from 1 to about 11, to give a total of up to about 12 ester units.

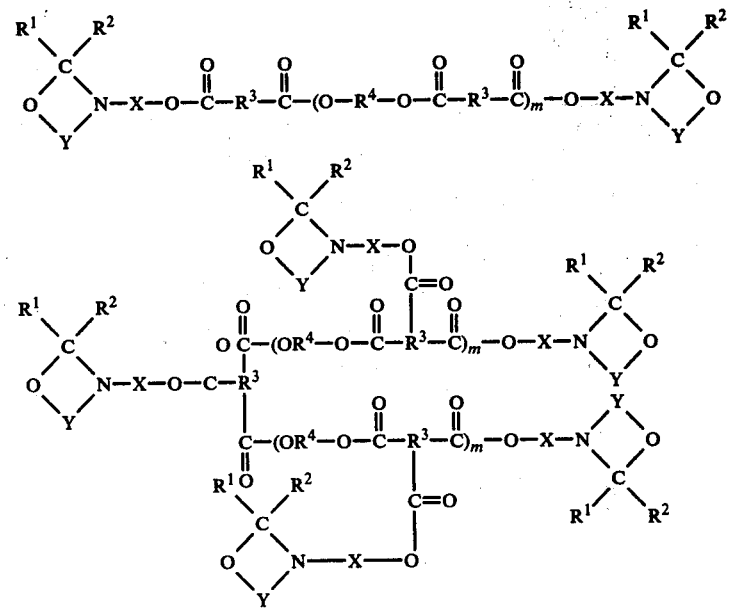

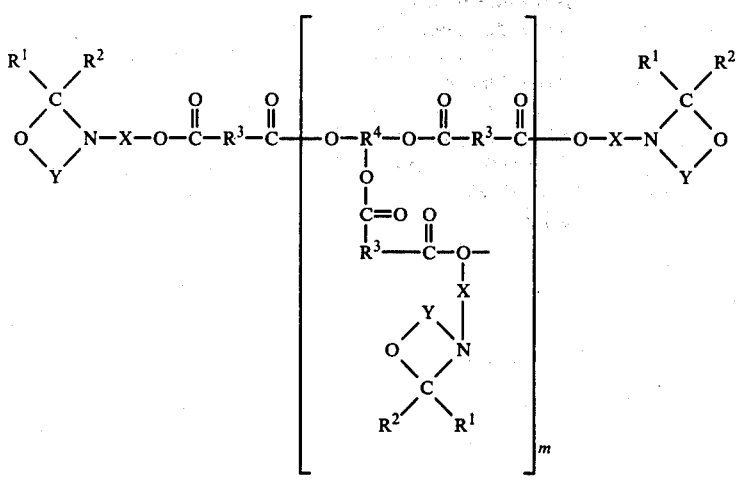

Of course, the triols or tricarboxylic acids can lead to much more branching than shown. The value of m must be low enough for the material to be of a useable viscosity for coatings, preferably without an organic solvent.

In contrast, a typical product of U.S. Pat. No. 3,864,335 using the same designations for radicals, etc. is:

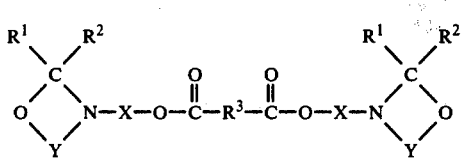

It will be noted that the difference is in the use of a carboxyl-terminated polyester in place of a dicarboxylic acid.

The polyfunctional oxazolidines of this invention are weak bases having no active hydrogen, and in effect they are blocked non-reactive amines. However, the compounds of this invention become highly reactive when they are hydrolyzed by exposure to atmospheric moisture to produce a strong base having both amine and hydroxyl functionality.

The polyfunctional ester oxazolidine monomers and polymers of this invention are mixed with electrophilic reagents, such as organic isocyanates, containing at least two isocyanate groups, to form a composition with good pot life which cures in the presence of moisture at ambient or elevated temperatures, to produce tough, tack-free coatings with excellent mechanical properties.

The polyfunctional oxazolidines are excellent starting materials for electrophilic quenching reactions used to produce moisture-cured coating systems such as are described in U.S. Pat. Nos,. 3,743,626 and 3,864,335.

The use of oxazolidines with isocyanates in forming hydrocurable compositions is amply described in U.S. Pat. No. 3,743,626. In that patent are described many examples of the uses of the simple oxazolidine esters (not polyesters) disclosed in U.S. Pat. No. 3,864,335. The polyesters disclosed in the present application are prepared using many of the oxazolidines described in U.S. Pat. No. 3,743,626 and are generally capable of the same uses disclosed in U.S. Pat. No. 3,864,335. The isocyanates useful in preparing the polyesters of the present invention are disclosed in detail in U.S. Pat. No. 3,743,626 (columns 10 and 11), and they are all incorporated herein by reference.

A wide variety of polyfunctional isocyanates, that is isocyanates having at least two -NCO groups, can be used in the compositions of the invention and substantially any isocyanate having two or more -NCO groups which will react with an oxazolidine in the presence of moisture can be used. The isocyanates which are used in the compositions of the invention are well known in the art.

Among the polyisocyanates which can be used in the compositions of the invention are aliphatic isocyanates such as 1,6-hexamethylene diisocyanate, 1,8-octamethylene diisocyanate, 1,12-dodecamethylene diisocyanate, 2,2,4-methylhexamethylene diisocyanate, and similar alkylene diisocyanates, 3,3'-diisocyanatodipropyl ether, 3-isocyanatomethyl-3,5,5-trimethylcyclohexylisocyanate, cyclopentylene-1,3-diisocyanate, cyclohexylene-1,4-diisocyanate, methyl 2,6-diisocyanatocaproate, and related isocyanates, bis(2-isocyanatoethyl)furmarate, 4-methyl-1,3-diisocyanatocyclohexane, trans-vinylene diisocyanate and similar unsaturated isocyanates, 4,4'-methylene-bis(isocyanatocyclohexane), and related isocyanates, menthane diisocyanate, N,N'N"-tris(6-isocyanatohexamethylene)biuret, and related isocyanates, bis(2-isocyanatoethyl)carbonate, and similar carbonate diisocyanates, as well as other known isocyanates derived from aliphatic polyamines, aromatic isocyanates such as tolylene diisocyanates, xylylene diisocyanates, dianisidine diisocyanate, 4,4'-diphenylmethane diisocyanate, 1-ethoxy-2,4-diisocyanatobenzene, 1-chloro-2,4-diisocyanatobenzene, tris(4-isocyanatophenyl)methane, naphthalene diisocyanates, fluorene diisocyanates, 4,4'-biphenyl diisocyanate; phenylene diisocyanates, 3,3'-dimethyl-4,4'-biphenyl diisocyanate, p-isocyanatobenzyl isocyanate, tetrachloro-1,3-phenylene diisocyanate, and related isocyanates, 2,4,6-tribromo-1,3-phenylene diisocyanate, bis(2-isocyanatoethyl)benzene, vinyl polymers containing isocyanatoethyl methacrylate as a monomer or comonomer, prepolymers of polyisocyanates with polyhydroxyl or polyamino compounds, such as prepolymers of 3-isoyanatomethyl-3,3,5-trimethylcyclohexylisocyanate, tolylene diisocyanate, menthane diisocyanate, 4,4'-methylene-bis(cyclhexylisocyanate), 4,4'-methylene-bis-(isocyanatocyclohexane), 2-isocyanatoethyl-6-isocyanatocaproate, and the like with polyether polyols, polyester polyols and the like. Diisocyanates are preferred.

The reaction between the oxazolidine component and the isocyanate component of the composition can be initiated by atmospheric moisture. Even a trace amount of atmospheric moisture is generally sufficient to initiate the polymerization reaction and, thus, cure the composition. If desired, water may be added to the compositions to effect cure, but this is not necessary. It is believed that the polymeric materials formed from the compositions of the invention result from the rapid hydrolysis of the oxazolidine which opens the oxazolidine ring at one of the bonds to the oxygen atom. The aminoalcohol which is produced during the hydrolysis has two active hydrogen sites which will react rapidly with the isocyanate. Although the isocyanate can react with either the amino group or the hydroxyl group, it is believed that reaction preferentially occurs with the amino group. Since the isocyanate is polyfunctional and the oxazolidine reacts in the presence of water as a polyfunctional compound, their reaction as described above will produce a highly polymeric material. Of course, a compound having more than one oxazolidine group will react as a polyfunctional material even if the isocyanate and oxazolidine are present in such proportions as to cause primary reaction during cure with the amine functionality only. While the hydrocuring reaction, that is, the hydrolysis, and ensuing polymerization, will normally occur rapidly at ambient temperatures, elevated temperatures may facilitate reaction and curing under some conditions.

The ratio of isocyanate to oxazolidine in the compositions of the invention is not critical and can be varied greatly to influence the nature and properties of the polymeric material which will be formed. For example, the isocyanate and oxazolidine can be present in ratios such that reaction during cure will primarily take place between the isocyanate and the amino group of the hydrolyzed oxazolidine. In general, the ratio of molar equivalents of isocyanate to oxazolidine in the compositions will be from about 1:10 to about 100:1 and the preferred ratio is from about 1:1.1 to about 2.5:1.

The hydrocuring reaction can be carried out with or without a catalyst. Under certain conditions, an acid catalyst, such as p-toluenesulfonic acid, dibutyltin octoate, zinc chloride, hydrogen chloride, or the like, may be advantageously employed. The acid catalyst will generally be present in an amount of from about 0.001% to about 10% by weight based on the weight of oxazolidine, and preferably from about 1% to about 5% by weight.

The compositions of the invention need not contai a solvent, but a suitable inert solvent can be added to the composition, if desired, either at the time of original formulation or at the time of use. The rates of the hydrolysis of the oxazolidine and the subsequent reaction with isocyaate can be influenced by the presence of a solvent. Solvents which are suitable for use in the compositions of the invention should be substantially free from active hydrogen atoms as determined by the Zerewitinoff method, described in Kohler et al, J. Am. Chem. Soc., 40, 2181-8 (1927), and should also be substantially anhydrous. Included among the solvents which can be used are toluene, xylene, liquid aliphatic hydrocarbons, isopropyl ether, ethyl acetate, β-ethoxyethyl acetate, methyl ethyl ketone, and the like, as well as mixtures of such solvents. Pigments, dyes, fillers, antioxidants and antiozodants, stabilizers, flow control agents, or other optional ingredients can also be included in the compositions of the invention.

EXAMPLE 1

(in Table I)

Preparation of 2-Isopropyl-hydroxyethyloxazolidine terminated adipate-1,4-butanediol polyesters To a 3-liter 4-neck flask equipped with stirrer, thermometer, and a 10 plate Oldershaw column equipped with variable-rate takeoff was added 696 g. (4.0 moles) of dimethyl adipate, 270.4 g. (3.0 moles) of 1,4-butanediol, 318.4 g. (2.0 moles) of 2-isopropyl-1(2-hydroxyethyl) oxazolidine, 1200 g. of toluene, and 17.3 g. of 25% sodium methoxide in methanol. The presure was reduced to 200 mm, and the reaction flask was heated at 55° C. Distillation of a methanoltoluene azeotrope, b.p. 33° C. started. Takeoff was reduced to 25% as the head temperature increased. In six hours, the temperature reached 62° C. and 233 g. of methanol had been collected in the distillate. Then 31.8 g. additional 2-isopropyl-hydroxyethyloxazolidine and 8.7 g. of 25% sodium methoxide in methanol was added, and heating was continued for another 6 hours. A total of 259 g. of methanol had been collected. To the cooled solution was added 22.9 g. of p-toluenesulfonic acid. The salts were removed by filtration, and the residual toluene was removed under reduced pressure on a rotary evaporator to give the first polyester listed in Tables I and II.

EXAMPLES 2-13

These compounds were prepared as in Example 1, but using the materials given in Table I to obtain the compounds described in Table II.

Table I below illustrates the types of products made in accordance with the present invention. Examples 1-13, inclusive, thereof show generally how those products are made by reference to the components used in their manufacture. Examples 14 and 15 describe typical manufacturing process steps in more detail. Table II gives the approximate average composition of the polyesters of Examples 1-13. Of course, since the lower alkyl ester of the polycarboxylic acid, the polyol, and the hydroxy oxazolidine are, in these examples, reacted simultaneously, there will be a distribution of polyester unit sizes, and some formation of, for example, the bis-(oxazolidinyl)adipate. That is, a given formula in Table II is a statistical average. The bulk of the product, however, has the formula given.

TABLE I

| Example | Oxazolidine Used | Methyl Ester Used | Alcohol(s)[4] Used | Composition[1] |
|---|---|---|---|---|
| 1[2] | IPOX[5] | adipate | 1,4BD | 2/4/3 |
| 1a[3] | IPOX[5] | adipate | 1,4BD | 2/4/3 |
| 2 | IPOX[5] | adipate | 1,4BD/TMP (5/1) | 2/4/3 |
| 3 | IPOX[5] | terephthalate | DPG | 2/4/3 |
| 4 | IPOX[5] | terephthalate | DPG/TMP (5/1) | 2/4/3 |
| 5 | IPOX[5] | terephthalate | NPG | 2/4/3 |
| 6 | IPOX[5] | adipate | 1,4BD | 2/5/4 |
| 7 | IPOX[5] | adipate/terephthalate | 1,4BD | 2/4/3 |
| 8 | IPOX[5] | adipate | NPG | 2/4/3 |

TABLE I-continued

| Example | Oxazolidine Used | Methyl Ester Used | Alcohol(s)[4] Used | Composition[1] |
|---|---|---|---|---|
| 9 | IPOX[5] | adipate | 1,4BD | 2/3/2 |
| 10 | HEOX[6] | adipate | 1,4BD | 2/3/2 |
| 11 | IPOX | adipate | 1,4BD | 2/2/1 |
| 12 | DMHEOX[7] | adipate | 1,4BD | 2/2/1 |
| 13 | IPOX | isophthalate | 1,4BD | 2/2/1 |

Footnotes for Table I

[1]Approximate composition in moles oxazolidine/moles ester (as diester)/moles alcohol. In most cases (see description of Example 1) a 10% excess of oxazolidine alcohol is used to insure more complete capping of the polyester chain. A slight reduction in polyester molecular weight may result.

[2]By gel permeation chromatography, $\overline{M}w = 1515$, $\overline{M}n = 1115$. Catalyst used was sodium methoxide.

[3]By gel permeation chromatography, $\overline{M}w = 1910$, $\overline{M}n = 1270$. Catalyst used was dibutyltin oxide.

[4]1,4BD is 1,4-butanediol TMP is trimethylolpropane DPG is dipropyleneglycol NPG is neopentylglycol

[5]IPOX is 2-isopropyl-3-(2-hydroxyethyl)oxazolidine.

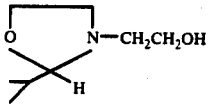

[6]HEOX is 3-(2-hydroxyethyl)oxazolidine

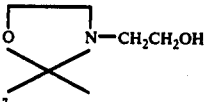

[7]DMHEOX is 2,2-dimethyl-3-(2-hydroxyethyl)oxazolidine

The compounds of Table II represent a preferred group having the formulae:

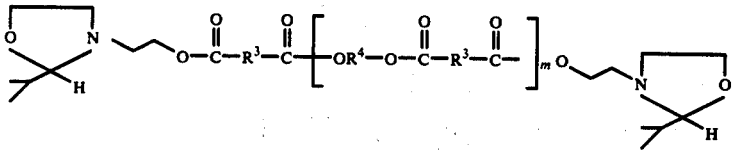

and

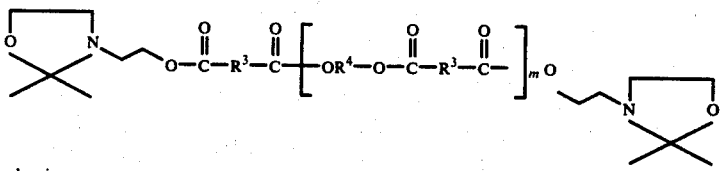

wherein
$R^3$ and $R^4$ are as above, and m is from 1 to 4.

TABLE II

| Example | Average Composition of Polyester |
|---|---|

1

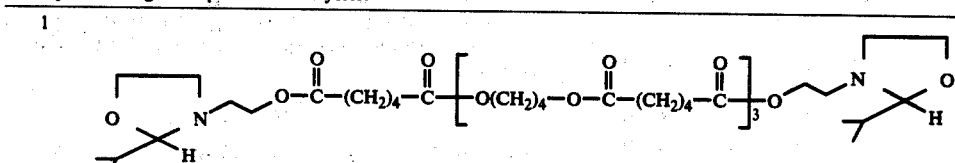

1a (same as above, essentially, but slightly higher molecular weight)
2 (same as above, but with some tri-branched structure:)

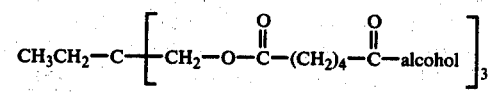

3

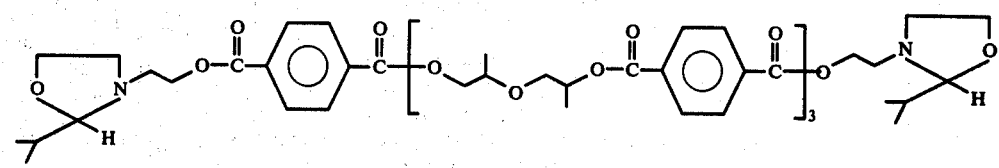

4 (same as above, with some tri-branched structure:)

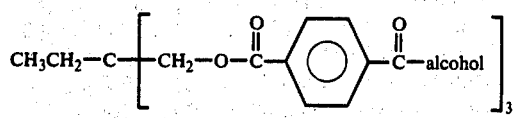

TABLE II-continued

| Example | Average Composition of Polyester |
|---|---|
| 5 | |
| 6 | (same as 1, polyester unit = 4) |
| 7 | Statistical mixture of 1 and 3 with acid residues randomly mixed in polyester chains |
| 8 | |
| 9 | (same as 1, polyester unit = 2) |
| 10 | |
| 11 | |
| 12 | |
| 13 | |

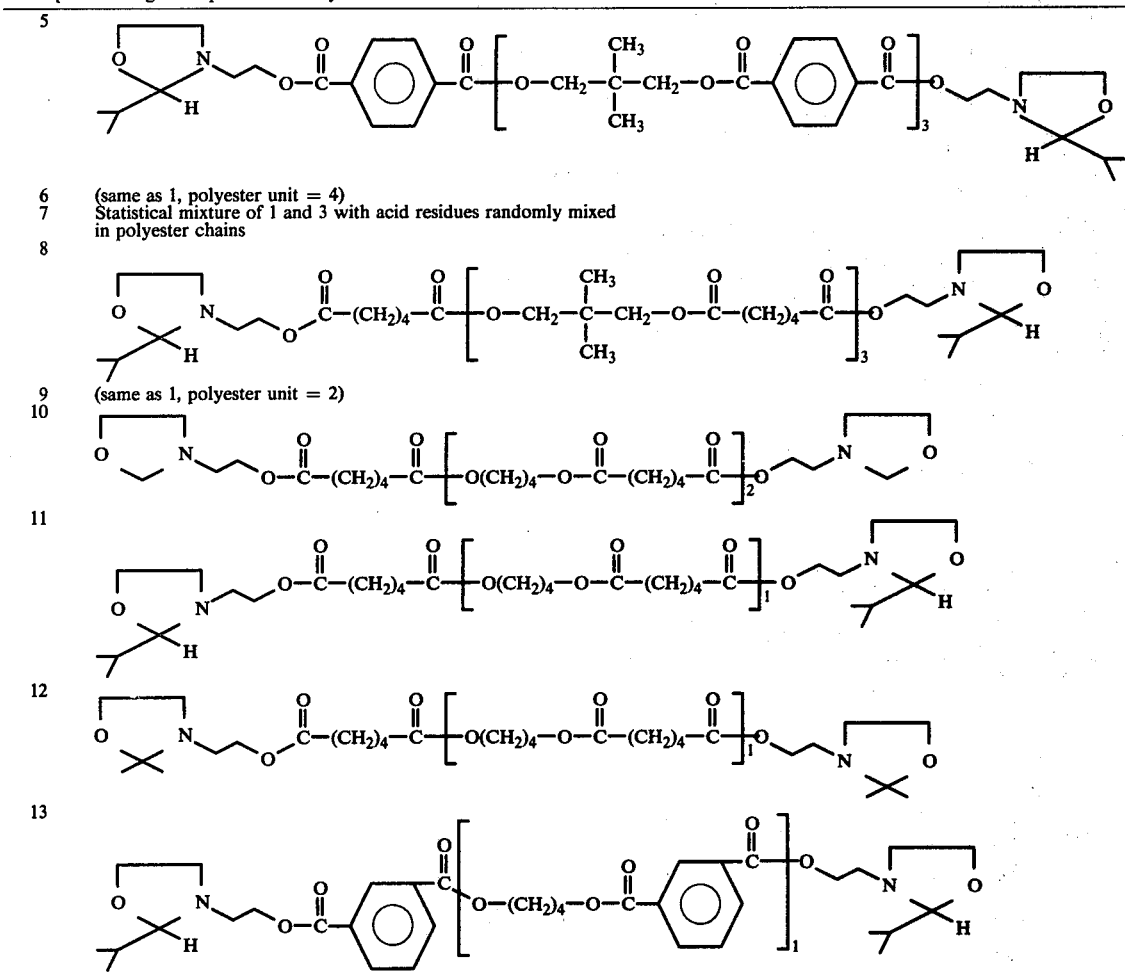

EXAMPLE 14

Preparation of a Polyfunctional Oxazolidine Polyester From a Triol, a Diester and IPOX To the apparatus described for Example 1 is charged 522 g. (3.0 moles) of dimethyl adipate, 134.2 g. (1.0 mole) of trimethylolpropane, 525.4 g. (3.3 moles) of 2-isopropyl-3-(2-hydroxyethyl)oxazolidine, 1200 g. of toluene and 17.3 g. of 25% sodium methoxide in methanol. The heating schedule of Example 1 is followed, and in two hours about 95% of the theoretical amount of methanol is removed as the toluene azeotrope. To the cooled solution is added 15.3 g. of p-toluenesulfonic acid. Filtration and evaporation of the solvent at reduced pressure gives the polyfunctional polyester.

EXAMPLE 15

Preparation of a Polyfunctional Oxazolidine Polyester from a Triester, a Diol and IPOX To the apparatus described for Example 1 is charged 436 (2.0 moles) of the trimethyl ester of propane-1,2,3-tricarboxylate, 668.7 g. (4.2 moles) of 2-isopropyl-3-(2-hydroxyethyl) oxazolidine, 90 g. (1.0 mole) of 1,4-butanediol, 1500 g. of toluene and 17.3 g. of 25% sodium methoxide in methanol. The heating schedule of Example 1 is followed, and in twelve hours 95% of the theoretical amount of methanol is removed as the toluene azeotrope. To the cooled solution is added 15.3 g. of p-toluenesulfonic acid. Filtration and evaporation of the solvent at residual pressure gives the polyfunctional polyester.

EXAMPLE 16

As an illustration of an improvement over the prior art which is characteristic of the present invention, reference may be made to a prior art reaction between the oxazolidine and the isocyanate components in which a commerically available isocyanate, "Desmodur" N, is employed. As shown in U.S. Pat. No. 3,743,626, column 16, designation S, Desmodur N is a product of the Mobay Chemical Co., believed to be a biuret triisocyanate prepared from the reaction of hexamethylene diisocyanate and water, supplied as a 75% solution. Desmodur N is an expensive component of this reaction, and a large amount of it is required in the prior art reaction employed to make useful coatings, particularly coatings having satisfactory floor wear properties. In many such prior art systems of oxazolidines and Desmodur N the resulting coatings are extensively hydroplasticized and become quite hard in low humidity conditions. Excessive hardness may lead to poor wearing properties. By comparison, when polyesters of the present invention are employed, such as those shown in Table I above, reduced levels of the Desmodur N crosslinker are required and softer, more flexible films result. The improved flexibility of the oxazolidine polyester/isocyanate prepolymer coating compositions of the present invention are shown in Table III below.

Coating compositions are prepared by mixing in conventional equipment the following materials:

TABLE III

| Materials | Parts By Weight | | | | |
|---|---|---|---|---|---|
| | A | B | C | D | E |
| "Desmodur" N 100* | 55.0 | — | 65.0 | — | 41.0 |
| "Tranco" A375AV (75%)** | — | 85.3 | — | 97.3 | — |
| L8072 | — | — | 35.0 | 27.0 | — |
| 3167 | 45.0 | 36.0 | — | — | — |
| R-865 | — | — | — | — | 69.4 |
| Xylene | 50.0 | 39.3 | 49.5 | 37.8 | 50.0 |
| "Cellosolve" Acetate | 49.3 | 38.6 | 49.3 | 37.1 | 38.9 |
| SF-1023 (10%)*** | 0.75 | 0.75 | 0.75 | 0.75 | 0.75 |
| p-Toluenesulphonic acid (20%) | — | — | 0.50 | — | — |
| T-12 (dibutyltindilaurate, 5%) | — | — | 0.10 | — | — |
| TOTAL | 200.1 | 200.0 | 200.0 | 200.0 | 200.1 |
| Reactive Solids Content (%) | 50.0 | 50.0 | 50.0 | 50.0 | 50.0 |

*A 100% solids aliphatic polyisocyanate having an equivalent weight of 188. It is a high molecular weight biuret of 1,6-hexamethylene diisocyanate available as Desmodur N 100 from Mobay Chemical Company.
**Tranco A375AV is a light stable isocyanate terminated urethane adduct supplied by Trancoa Chemical Corp. and having the following properties:
  non-volatiles        75%
  viscosity a 25° C.   600 cps
  NCO                  11%
  solvent              MEK
  wt. gal.             8.5 lbs.
***An anti-cratering agent
L-8072 — bis-(2-isopropyloxazolidinylethyl)adipate (column 15, line 24 of U.S. Pat. No. 3,743,626)
R-865 — a low molecular weight copolymer of butyl methacrylate and oxazolidinylethyl methacrylate of equivalent weight 270
3167 — this invention; Example 11 in Table I above.

Tin plate panels are coated with the respective freshly-prepared compositions to provide 1.5 mils when cured to dry films. The coatings are allowed to cure through 180° F./2 minutes, followed by 350° F./6 minutes, and post-ambient conditions (room temperature, ambient moisture) for 2 weeks. If desired, steam can be present when curing the films at elevated temperatures. Free films are obtained through amalgamation of the tin plate, and on testing, show the following properties:

TABLE IV

| | Coating | | | | |
|---|---|---|---|---|---|
| | A | B | C | D | E |
| % elongation | 81 | 8 | 61 | V.Brittle | 8 |
| tensile strength (psi) | 2462 | 9301 | 3030 | V.Brittle | 5765 |

Prior to measurement, the films are allowed to equilibrate at conditions of 77° F./50% relative humidity. Measurements are conducted with an Instron Tester at a film extension rate = 0.5 inches/minute, full scale load = 20 lbs., on samples of width = 3/4 inch, and length = 1 inch.

EXAMPLE 17

In Table IV, which follows, the data illustrates the improved mechanical properties, i.e., flexibility and toughness, of oxazolidine polyester/isocyanate prepolymer coating compositions of the present invention at low humidity conditions. The data show the increase in % elongation at low humidity of the polyesters. The prior art simple esters apparently are plasticized with water at high humidity, but become hard and brittle at low humidity when the water leaves.

Coating compositions are prepared by mixing in conventional equipment the following materials:

TABLE V

| Material | Coating composition Parts By Weight | | |
|---|---|---|---|
| | A | B | C |
| Desmodur N* | 63.0 | 58.5 | 54.0 |
| L8072** | 37.0 | 18.5 | — |
| 3167*** | — | 23.0 | 46.0 |
| Methyl ethyl ketone | 13.0 | 13.0 | 13.0 |
| SF-1023 (10%) | 0.72 | 0.72 | 0.72 |
| p-toluenesulphonic acid (20%) | 5.0 | 5.0 | 5.0 |
| TOTAL | 118.7 | 118.7 | 118.7 |
| Reactive solids content | 85.1 | 85.1 | 85.1 |

*A 100% solids aliphatic polyisocyanate having an equivalent weight of 195. It is a high molecular weight biuret of 1,6-hexamethylene diisocyanate available as L-2291 from Mobay (essentially a lower viscosity version of Desmodur N 100).
**bis-(2-isopropyloxazolidinylethyl)adipate (oxazolidine V, column 15, U.S. Pat. No. 3,743,626)
***2-isopropyl-hydroxyethyloxazolidine terminated adipate-1,4-butanediol polyester (Example 11, this application)

Steel panels and tin plate are coated with the respective freshly prepared compositions to provide films of 3.0 mils when dry. The films are allowed to cure at conditions of 77° F./50% relative humidity (R.H.) for 2 weeks and, on testing, show the following properties:

TABLE VI

| | Tensile strength at break (psi) | | Elongation at break | | Pencil Hardness | | Water Resistance 140° F/24 hours |
|---|---|---|---|---|---|---|---|
| R.H. when tested* | 50% | 1% | 50% | 1% | 50% | 1% | |
| Coating A | 3413 | 6905 | 91 | 15 | H | 2H | Good |
| Coating B | 2437 | 5353 | 116 | 19 | F | H-2H | Good |
| Coating C | 1325 | 4438 | 100 | 113 | F | H | Good |

*Films are allowed to equilibrate at the respective conditions prior to measurement of properties. Tensile and elongation properties are determined as described in Example 1.

EXAMPLE 18

Pigmented oxazolidine polyester/isocyanate prepolymer coating compositions are prepared which show improved low temperature properties of coatings made therefrom. A $TiO_2$ pigment grind is prepared as follows:

TABLE VII

| | Parts |
|---|---|
| R-865 (85%)* | 50 |
| Xylene | 75 |
| n-butyl acetate | 75 |
| Rutile $TiO_2$ | 400 |
| ASCO graded sand, 20-30 mesh | 600 |

*A low molecular weight oligomeric copolymer of 65 weight % of n-butyl methacrylate and 35 weight % of oxazolidinylethyl methacrylate (OXEMA) having an equivalent weight of 270 and a viscosity of 100 poises at 85% concentration in "Cellosolve" acetate.

The above mixture is ground on a sand mill at 2360 FPM for 15 minutes and then passed through an extra fine varnish filter to remove the sand.

The resulting pigment dispersion (73.75% solids) is used in preparing the following coating compositions:

TABLE VIII

| Formulation of the Enamel | Coating Composition Parts By Weight | |
|---|---|---|
| | A | B |
| Filtered pigment dispersion | | |

TABLE VIII-continued

| Formulation of the Enamel | Coating Composition Parts By Weight | |
|---|---|---|
|  | A | B |
| (73.75%) | 60.0 | 60.0 |
| Desmodur N-75** | 33.6 | 38.4 |
| R-865 (85%) | 35.9 | 13.3 |
| Polyester oxazolidine of Example 11 | — | 15.6 |
| TOTAL | 129.5 | 127.3 |
| Total Solids (%) | 77.2 | 78.5 |
| Viscosity (#4 Ford Cup) | 40 sec. | 21 sec. |

**A high molecular weight biuret of 1,6-hexamethylene diisocyanate at 75% solids content in cellosolve acetate/xylene, weight ratio 50/50, having an equivalent weight of 188 based on solids content. This material is available from Mobay.

The resulting enamels are applied on steel panels to provide 1.5 mils of dry film, are allowed to cure one week at ambient conditions and, on testing, display the following properties:

TABLE IX

|  | Coating A | Coating 8 |
|---|---|---|
| Tack-free time | 2 hours | 2 hours |
| Pencil hardness | 3H | 3H |
| Tukon hardness (KHN) | 15.0 | 4.0 |
| Reverse Impact (inch-lbs.) | 5 | >30 |
| ⅛" Mandrel (25° C.) | passes | passes |
| ⅛" Mandrel (−65° C.) | complete failure | passes |
| Gloss (20°/60°) | 80/90 | 82/91 |

In the foregoing examples the polymers have a $\overline{M}w$ of between approximately 600 and 2000 and an $\overline{M}n$ of between approximately 400 and 1500, as determined by gel permeation chromatography.

The molecular weights are determined by gel permeation chromatography (GPC).

We claim:

1. A hydrocurable composition comprising (1) a polyester terminated with a plurality of oxazolidine groups and (2) a polyfunctional isocyanate.

2. The composition of claim 1 in which the polyester has the general formula:

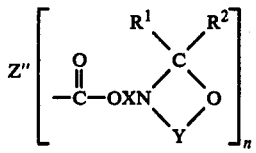

wherein
Z" is the residue of a polyester having a plurality of terminal

groups, the polyester being the condensation product of organic acids and alcohols of the formulae

and $R^4(OH)_p$, in which o is 2 or 3 and p is 2 to 4;
$R^1$ and $R^2$ are hydrogen, $C_1$-$C_4$ alkyl, phenyl, benzyl, or collectively, $C_5$-$C_6$ cycloalkylene;
$R^3$ is a covalent bond, a $C_1$-$C_{10}$ residue of an aliphatic or aromatic polycarboxylic acid/

$R^4$ is the residue of a polyol having 2-15 carbon atoms;
X and Y are selected from the radicals $(-CH_2-)_2$ and $-(-(CH_2-)_3$; and
n is an integer having a value of at least 2;
the acid moieties being present in an amount of from 2 to about 12 units and the alcohol moieties numbering from 1 to about 11, with the proviso that said oxazolidine-terminated polyesters provide a useable viscosity for coatings in the formulations in which they are used.

3. The composition of claim 2 in which the polyester is of a diol and a dicarboxylic acid, between 2 moles and 6 moles of acid moieties being present, and n is no more than about 8.

4. The composition of claim 3 in which the acids and diols are aliphatic, and the isocyanate has two or three —NCO groups, wherein:
o and p are each 2,
$R^1$ and $R^2$ are hydrogen,
X and Y are $-(CH_2-)_2$, and
n is from 2 to 4.

5. The composition of claim 3 in which the acid is aromatic and the diol is aliphatic, and the isocyanate has two or three, —NCO groups. wherein
o and p are each 2,
$R^1$ and $R^2$ are hydrogen,
X and Y are $-(CH_2-)_2$, and
n is from 2 to about 8.

6. The composition of claim 3 in which n is from Z to about 4, the acid moiety is adipic, terephthalic, isophthalic, phthalic, or azelaic and the diol is 1,4-butanediol, dipropylene glycol, neopentyl glycol, ethylene glycol, diethylene glycol, 1,3; -butylene glycol, and 1,6-hexanediol. and the isocynate has two —NCO groups.

7. A polyfunctional oxazolidine-terminated polyester of the general formula:

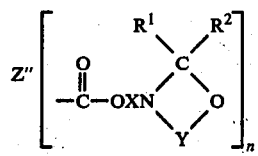

wherein
Z" is the residue of a polyester having a plurality of terminal

groups, the polyester being the condensation product of organic acids and alcohols of the formulae

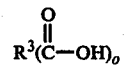

and $R^4(OH)_p$, in which o is 2 or 3 and p is 2 to 4;
$R^1$ and $R^2$ are hydrogen, $C_1$-$C_4$ alkyl, phenyl or benzyl;
$R^3$ is a covalent bond, a $C_1$-$C_{10}$ alkyl or cycloalkyl, or phenyl;
$R^4$ is a $C$-$C_{10}$ alkyl or cycloalkyl, or the residue of a poly($C_2$-$C_3$)glycol having 2-15 carbon atoms;

X and Y are selected from the radicals (—CH$_2$—)$_2$ and —(—CH$_2$—)$_3$; and n is an integer having a value of at least 2;

the acid moieties being present in an amount of from 2 to about 12 units and the alcohiol moieties numbering from 1 to about 11, with the proviso that said oxazolidine-terminated polyesters provide a useable viscosity for coatings in the formulations in which they are used.

8. The compositions of claim 7 in which the polyester is of a diol and a dicarboxylic acid, and n is no more than about 8.

9. The composition of claim 9 in which the acid and diol are aliphatic.

10. The composition of claim 8 in which the acid is aromatic and the diol is aliphatic.

11. The composition of claim 8 in which the acid moiety is adipic, terephthalic, isophthalic, phthalic or azelic and the diol is 1,4-butanediol, dipropylene glycol, neopentyl glycol, 12. A process of coating or impregnating a substrate comprising the steps of applying the composition of claim 1 thereto, and exposing the composition to moisture.

13. A process of coating or impregnating a substrate comprising the steps of applying the composition of claim 2 thereto, and exposing the composition to moisture.

14. A process of coating or impregnating a substrate comprising the steps of applying the composition of claim 3 thereto, and exposing the composition to moisture.

15. A process of coating or impregnating a substrate comprising the steps of applying the composition of claim 4 thereto, and exposing the composition to moisture.

16. A process of coating or impregnating a substrate comprising the steps of applying the composition of claim 5 thereto, and exposing the composition to moisture.

17. A proces of coating or impregnating a substrate comprising the steps of applying the composition of claim 6 thereto, and exposing the composition to moisture.

18. An article made by the process of claim 12.

19. An article made by the process of claim 13.

20. A compound of the statistical average formula:

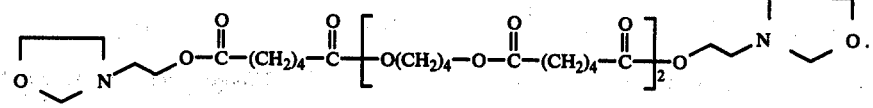

21. A compound of the statistical average formula:

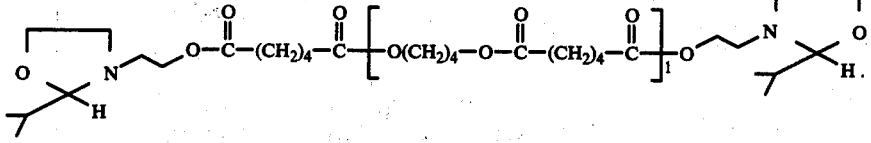

22. A compound of the statistical average formula:

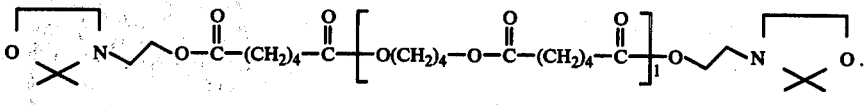

23. A compound of the statistical average formula:

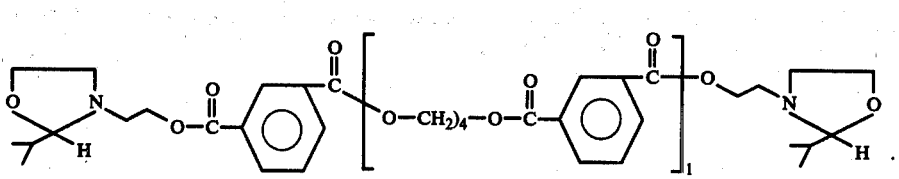

24. A compound of the statistical average formula:

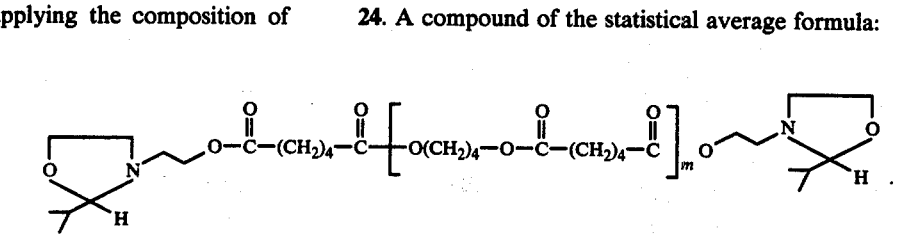

wherein m is 1 to 4.

25. A compound of the statistical average formula:

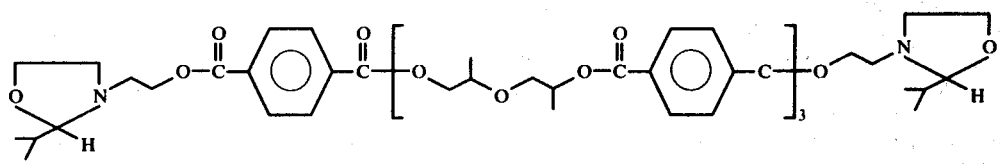

26. A compound of the statistical average formula:

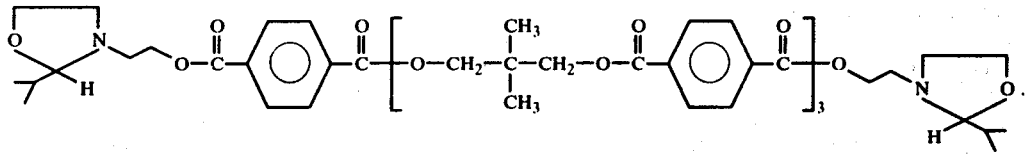

27. A compound of the statistical average formula:

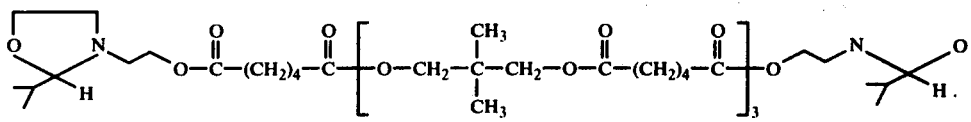

28. Compounds having the formulae:

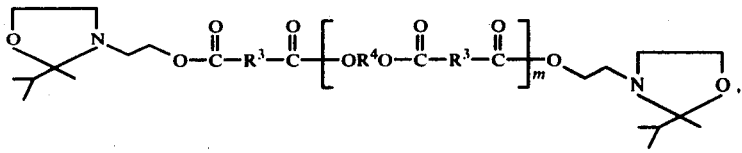

and

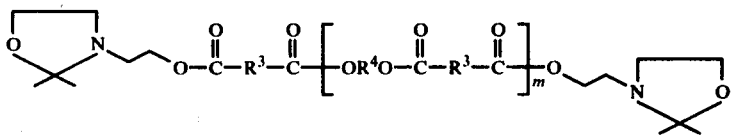

in which
R³ is a covalent bond, a C₁-C₁₀ alkyl or cycloalkyl, or phenyl; and
R⁴ is a C₁-C₁₀ alkyl or cycloalkyl, or the residue of a poly(C₂-C₃)glycol having 2-15 carbon atoms;

and the statistical average value of m is from 1 to 4, said compounds having an approximate Mw of from 600 to 5000 and an approximate M̄n of from 400 to 3000.

29. A method of preparing a polyester terminated with a plurality of oxazolidine groups comprising the steps of dissolving a polyol, a polycarboxylic acid ester in which the carboxyl groups are esterified by a C₁-C₄ alkanol, and a hydroxy oxazolidine in an organic solvent, along with a transesterification catalyst, and heating the mixture to a temperature at which the materials react, and removing the resulting C₁-C₄ alkanol.

* * * * *

UNITED STATES PATENT AND TRADEMARK OFFICE
CERTIFICATE OF CORRECTION

PATENT NO. : 4,138,545

DATED : February 6, 1979

INVENTOR(S) : William D. Emmons et al

It is certified that error appears in the above-identified patent and that said Letters Patent are hereby corrected as shown below:

Column 2, line 56 - Change "z is the" to read - -Z is the- -

Column 3, line 9 - Change "having 2-5" to read - - having 2-15- -

Column 6, line 64 - Change "isoyanoto" to read - -isocyanato- -

Column 7, line 52 - Change "not contai" to read - -not contain- -

Column 8, line 28 - Change "hours, the" to read - -hours, the head- -

Column 13, line 26 - Change "polysocyanate" to read - -polyisocyanate- -

Column 15, line 20 - Change "Coating 8" to read - -Coating B- -

Column 16, line 34 - Change "1,3;-butylene" to read - -1,3-butylene- - line 67 - Change "C-$C_{10}$" alkyl" to read - -$C_1$-$C_{10}$ alkyl - -

Column 17, line 12 - Change "claim 9 " to read - -claim 8- - line 18 - Change "azelic" to read - -azeleic- -

Column 18, line 15 - Change "proces" to read - -process- -

Signed and Sealed this

Sixth Day of November 1979

[SEAL]

Attest:

RUTH C. MASON
Attesting Officer

LUTRELLE F. PARKER
Acting Commissioner of Patents and Trademarks